United States Patent [19]

McCarty et al.

[11] Patent Number: 5,776,344
[45] Date of Patent: Jul. 7, 1998

[54] METHOD FOR REMOVING NITROGEN FROM WASTEWATER

[75] Inventors: Donald J. McCarty, Mechanicsburg, Pa.; Keith Dobie, Humarock, Mass.

[73] Assignee: Tetra Technologies Inc., The Woodlands, Tex.

[21] Appl. No.: 548,556

[22] Filed: Oct. 26, 1995

[51] Int. Cl.$^6$ ............................................ C02F 3/30
[52] U.S. Cl. .......................... 210/605; 210/618; 210/903
[58] Field of Search .......................... 210/903, 605, 210/615–618, 620, 630, 610, 611

[56] References Cited

U.S. PATENT DOCUMENTS

| | | |
|---|---|---|
| 1,050,930 | 1/1913 | Edge et al. |
| 1,995,367 | 3/1935 | Stewart .................. 210/13 |
| 2,529,141 | 11/1950 | Danel .................... 61/18 |
| 3,234,123 | 2/1966 | Hinde .................... 210/7 |
| 3,293,174 | 12/1966 | Robjohns ................ 210/17 |
| 3,709,364 | 1/1973 | Savage .................. 210/193 |
| 3,713,543 | 1/1973 | Heaney .................. 210/196 |
| 3,835,038 | 9/1974 | Heaney .................. 210/4 |
| 3,853,752 | 12/1974 | Tymoszcuk .............. 210/17 |
| 3,970,555 | 7/1976 | Savage et al. ............ 210/80 |
| 3,994,803 | 11/1976 | Neff et al. ............... 210/8 |
| 4,009,105 | 2/1977 | Jeris .................... 210/107 |
| 4,035,290 | 7/1977 | Torpey .................. 210/14 |
| 4,051,039 | 9/1977 | Heaney .................. 210/293 |
| 4,064,050 | 12/1977 | Heaney et al. ........... 210/274 |
| 4,159,945 | 7/1979 | Savage .................. 210/151 |
| 4,173,531 | 11/1979 | Matsch et al. ............ 210/5 |
| 4,179,374 | 12/1979 | Savage et al. ........... 210/151 |
| 4,332,904 | 6/1982 | Kurane et al. ........... 435/262 |
| 4,351,729 | 9/1982 | Witt .................... 210/603 |
| 4,415,454 | 11/1983 | Fuchs .................... 210/616 |
| 4,545,909 | 10/1985 | Atkinson et al. .......... 210/616 |
| 4,604,197 | 8/1986 | Louboutin et al. ......... 210/150 |
| 4,681,685 | 7/1987 | Sutton et al. ............ 210/618 |
| 4,756,831 | 7/1988 | Menzel et al. ............ 210/617 |
| 4,780,198 | 10/1988 | Crawford et al. .......... 210/151 |
| 4,800,021 | 1/1989 | Desbos .................. 210/605 |
| 4,923,606 | 5/1990 | Gresh et al. ............. 210/275 |
| 4,970,000 | 11/1990 | Eppler et al. ............ 210/605 |
| 5,019,266 | 5/1991 | Soeder et al. ............ 210/605 |
| 5,124,039 | 6/1992 | Brautigam ............... 210/610 |
| 5,137,636 | 8/1992 | Bundgaard ............... 210/605 |
| 5,156,742 | 10/1992 | Struewing ............... 210/605 |
| 5,160,043 | 11/1992 | Kos ..................... 210/605 |
| 5,192,442 | 3/1993 | Piccirilo et al. ......... 210/605 |
| 5,211,847 | 5/1993 | Kanow ................... 210/610 |
| 5,213,681 | 5/1993 | Kos ..................... 210/605 |

OTHER PUBLICATIONS

Mark K. Pare, "Biological Nitrogen Removal at Small Wastewater Treatment facilities", Winter 1994.

C.G. Check, D.H. Waller, S.A. Lee, D.A. Pask, J.D. Mooers, "The lateral-flow sand-filter system for septic-tank effluent treatment", Nov./Dec. 1994.

"Single-Home FAST Sewage System", Scienco/Fast, (date unknown).

"Ekofinn Bioclere" AWT Environmental Inc., (date unknown).

*Primary Examiner*—Thomas G. Wyse
*Attorney, Agent, or Firm*—Tobor & Goldstein, L.L.P.

[57] ABSTRACT

A process and apparatus for treating wastewater containing nitrogen compounds is disclosed. The process includes passing the wastewater to be treated through a biologically active material in one direction to treat the wastewater and passing the treated wastewater through the biologically active material in a second direction to further treat the wastewater under alternating aerobic and anoxic conditions, converting nitrogen compounds to nitrates and nitrites, and converting nitrates and nitrites to gaseous nitrogen. The apparatus includes a mixing tank that includes an upper equalization area and a lower sludge settling area, a filtration tank containing the biologically active material in communication with the mixing tank, an adjustable aeration inlet supplying air to the filtration tank under aerobic conditions and eliminating or reducing the supply of air to the filtration under anoxic conditions, and a clearwell in communication with the filtration tank for recirculating treated wastewater or discharging the treated wastewater.

20 Claims, 2 Drawing Sheets

METHOD FOR REMOVING NITROGEN FROM WASTEWATER

BACKGROUND OF THE INVENTION

1. Field of the Invention

The invention relates to the treatment of wastewater. More particularly, the invention relates to new and improved processes and apparatus to reduce the level of nitrogen compounds, as well as other contaminants such as BOD and suspended solids, in wastewater utilizing a filtration tank containing a biologically active material for the oxidation of wastewater to form nitrites and nitrates as well as the reduction of nitrites and nitrates to gaseous nitrogen by alternating the conditions in the filtration tank between substantially aerobic conditions and substantially anoxic conditions.

2. Description of Related Art

The presence of nitrogen compounds in lakes, rivers and other water resources has received worldwide attention. The presence of these nitrogen compounds in the environment is one of the primary causes of eutrophication. It is believed that these compounds promote unwanted growth of algae and other aquatic plants that consume dissolved oxygen. Consequently, there is increased demand to reduce nitrogen compounds in wastewater prior to discharge of the wastewater.

Recognizing the need to reduce the discharge of nitrogen compounds into the environment, a number of processes and apparatus have been proposed for the nitrification and denitrification of wastewater containing nitrogen compounds. Generally, in such systems, wastewater containing nitrogen compounds such as ammonia and organic nitrogen compounds is passed through a reactor vessel under aerobic conditions to oxidize the nitrogen compound to nitrites and nitrates and then passed through another reactor vessel under anoxic conditions to denitrify the nitrified wastewater. The nitrogen containing gas, including elemental nitrogen, formed during denitrification is discharged as is the treated wastewater effluent that has a reduced level of nitrogen compounds.

Typically such systems also utilize a settling tank between the nitrification and denitrification reactor vessels or a settling tank or clarification zone after the wastewater being treated has been passed through the denitrification vessel. Furthermore, as described in U.S. Pat. No. 4,159,945, some systems employ the use of a filtering system in the denitrification vessel.

Such systems have various shortcomings. For example, systems that rely on activated sludge or suspended growth to accomplish nitrification and/or denitrification require settling vessels or clarifiers. Accordingly, there is a need to develop processes and apparatus that reduce nitrogen compounds from wastewater to an environmentally acceptable level, are relatively simple to operate and maintain, and can be economically utilized, especially for single-family homes and small multiple-family homes.

SUMMARY OF INVENTION

In a broad aspect, this invention relates to a process and apparatus for reducing the levels of nitrogen compounds, BOD and/or suspended solids in wastewater to an environmentally acceptable level. In certain aspects, the system is relatively simple to operate and maintain, and can be economically utilized, especially for single-family homes and small multiple-family homes. More specifically, the invention, in one aspect, is directed to a process for treating wastewater by the step of passing the wastewater through a multi-functional biologically active material. In a preferred aspect, the process includes the step of passing the wastewater through the biologically active material in one direction to treat the wastewater followed by passing the treated wastewater through the same biologically active material in a second direction to further treat the wastewater. By passing the wastewater back and forth through the biologically active material, the wastewater is treated in an effective and efficient manner and nitrogen compounds and/or BOD may be removed. This cycle can be repeated multiple times to achieve the level of treatment desired. Preferably, the biologically active material comprises a support material such as granular filter media. In a preferred aspect, the wastewater to be treated may be passed through the biologically active material under alternating aerobic and anoxic conditions, or some variation or combination thereof. By passing the wastewater to be treated through the biologically active material under aerobic conditions, nitrogen compounds in the wastewater are converted to nitrates and nitrites. By passing the wastewater to be treated through the biologically active material under anoxic conditions, nitrates and nitrites are reduced to gaseous nitrogen, including elemental nitrogen and nitrous oxides, which may then be released to the atmosphere. Additionally, the wastewater may be passed through the biologically active material under anaerobic conditions to remove phosphorus compounds.

Preferably, granular filter media inoculated with microorganisms and arranged in a fixed film reactor or densely packed static bed are utilized as the biologically active material. In this manner, not only do the microorganisms nitrify and denitrify the wastewater under aerobic and anoxic conditions, but also filter inert and biological solids. In accordance with a specific embodiment of the invention, the aerobic and anoxic modes of operation can be easily and quickly adjusted using a valve controlling a blower to conduct and optimize nitrification and denitrification. As a further benefit of the invention, the process and apparatus are simple to operate, have relatively few components to maintain and are relatively inexpensive.

DETAILED DESCRIPTION OF THE INVENTION

Figure 1:
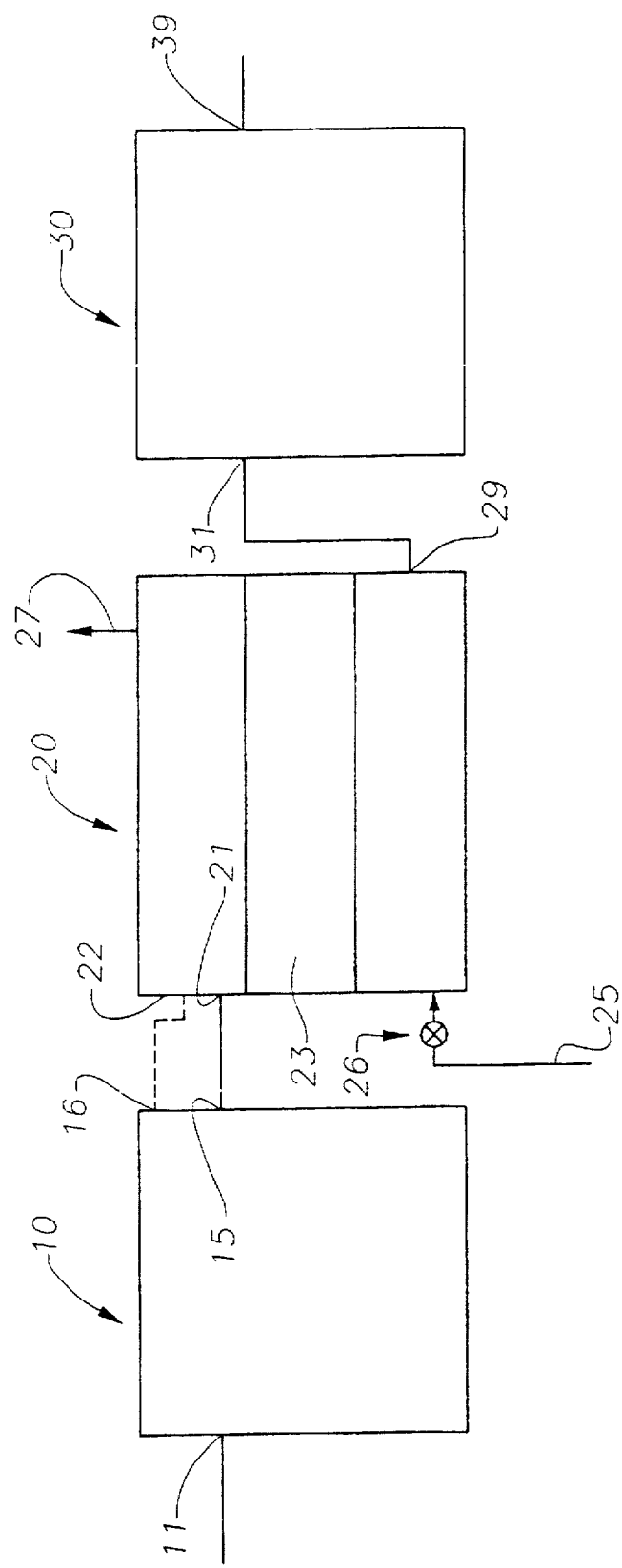
FIG. 1 is a schematic illustration of a preferred embodiment of an apparatus for conducting the process of the invention.

As discussed above, this invention relates to processes and apparatus for treating wastewater containing nitrogen compounds, as well as other contaminants such as BOD and suspended solids by reducing the levels of the nitrogen compounds, the BOD and suspended solids in the wastewater to environmentally acceptable levels. The term "BOD" refers to any organic material that exerts a biochemical oxygen demand, including various pollutants such as saccharides, carbohydrates, cellulose and ligands. Pollutants such as these are by-products of the process and activities that occur in many industrial settings, including the pulp and paper industry, and bottling and food preparation and manufacturing plants. In one broad aspect, the invention is directed to a process for passing wastewater containing nitrogen compounds through the same biologically active material in at least two different directions. After passing the wastewater through the material in a first direction, the wastewater is then passed through the same biologically active material in a second direction to further treat the wastewater. Such treatment converts at least a portion of the nitrogen compounds to nitrates and nitrites when the wastewater is passed through the biologically active materials under substantially aerobic conditions, and converts at least a portion of the nitrates and nitrites to gaseous nitrogen when the wastewater is passed through the biologically active material under substantially anoxic conditions. As used herein, the term "anoxic" means the absence of free dissolved oxygen, in contrast with "anaerobic" which means the absence of oxygen including chemically bound oxygen. In a specific embodiment of the invention, the treated wastewater passing through the biologically active material in a second direction passes through the biologically active material in a direction substantially opposite the wastewater that has passed through the biologically active material in the first direction. In a preferred embodiment of this invention, the wastewater passing through the biologically active material in the first direction is in a downflow direction and the treated wastewater passing through the biologically active material in the second direction is in an upflow direction.

In another broad aspect, the invention is directed to a process for removing nitrogen compounds from wastewater by passing the wastewater through a nitrogen treatment zone in a first direction followed by a second step of passing the wastewater back through the nitrogen treatment zone in a second direction to remove nitrogen compounds from the wastewater. The nitrogen treatment zone includes a biologically active material which converts at least a portion of the nitrogen compounds to nitrates or nitrites or both when oxygen is supplied to the biologically active material during passage of the wastewater through the nitrogen treatment zone and converts at least a portion of the nitrites and nitrates to gaseous nitrogen when free dissolved oxygen is substantially absent from the biologically active material during passage of the wastewater through the nitrogen treatment zone.

The biologically active material broadly includes any microorganism affixed to a solid support that is capable of accomplishing the desired nitrification and denitrification and/or the removal of BOD contaminants. The material includes a mixture or combination of microorganisms, preferably autotrophic and facultative heterotrophic bacteria. The autotrophic bacteria is capable of nitrifying the ammonia nitrogen to form nitrates and nitrites, while the facultative heterotrophic bacteria is capable of converting nitrates and nitrites to gaseous nitrogen, including elemental nitrogen, nitrous oxide and nitric oxide in an anoxic environment, and oxidizing BODs in an aerobic environment. The material is preferably in the form of a fixed film, which is herein defined as microorganisms that grow in a film on a support structure. The support structure may include granular media such as silica sand, a plastic media such as plastic beads, one or more sheets such as plastic sheets, or some other support such as rotating biological contactors. Preferably, the biologically active material comprises a biologically active filter. For example, a filter may include granular media configured in a packed bed reactor and inoculated with microorganisms, having a porosity of less than 80%, preferably less than about 60%, and more preferably less than about 40%. The biologically active material preferably comprises a support (e.g., silica sand) inoculated with the autotrophic and facultative heterotrophic bacteria. The autotrophic and facultative heterotrophic bacteria may be grown on the support by passing wastewater through the biologically active material and first providing conditions under which autotrophic bacteria will grow and then providing conditions under which facultative bacteria will grow. As is well known in the art, growth of these bacteria may be affected by many factors, including the presence of oxygen, the levels of nitrogen and BOD in the initial wastewater, and pH, which preferably ranges from 7 to 9. The biologically active material which includes the biologically active organisms act on the nitrogen compounds to oxidize those compounds to nitrites and nitrates and ultimately reduce them to gaseous nitrogen. They also reduce the level of BOD. A preferred granular media is silica sand, having a density of about 160 to 170 lbs/ft$^3$ (specific gravity of about 2.6 to 2.7). Advantageously, when the biologically active material comprises a biologically active filter, particularly granular media, filtration sufficient to remove suspended solids from the treated wastewater occurs when the wastewater is passed through the media. Furthermore, the treated wastewater flowing in the second direction provides backwashing to dislodge particulates from the media which may tend to lodge in the media during treatment and filtration.

Preferably, the granular media have an average particle size ranging from about 1 to 6 mm. More preferably, the biologically active granular media have an effective size range of about 2 to 3 mm, a maximum uniformity coefficient of 1.35, a minimum sphericity of 0.85, a Moh hardness of about 6 to 7, a minimum specific gravity of about 2.6, and a maximum hydrochloric acid solubility of 5%. In another embodiment, the granular media is contained in a deep bed filter having a lower layer of gravel or other coarse material to provide additional support and filtration. In this embodiment, the granular media are typically between 4 and 12 feet in depth.

As another feature of the invention, wastewater may be sufficiently treated by contacting the wastewater with the biologically active material, such that the discharged effluent has a level of nitrogen contaminants no greater than about 10 mg/L without a supplemental carbon source (e.g., methanol) or 3 mg/L with a supplemental carbon source; a BOD level no greater than about 30 mg/L; and a total suspended solids level no greater than about 30 mg/L. Typical initial levels of contamination in wastewater prior to treatment range from about 25 to 75 mg/L (e.g., about 50 mg/L) nitrogen from about 200 to 300 mg/L (e.g., about 250 mg/L) BOD and from about 200 to 300 mg/L (e.g., about 300 mg/L) total suspended solids.

Additionally, this invention may also include operations of the biologically active material under substantially anaerobic conditions to promote removal of phosphorus. Phosphorus removal is discussed in more detail in U.S. Pat. No. 4,141,822 to Levin et al., which is incorporated herein by reference.

In another broad aspect, the invention is directed to a process for treating wastewater containing nitrogen compounds by passing the wastewater to be treated through a biologically active material maintained under substantially aerobic conditions to oxidize at least a portion of the nitrogen compounds in the wastewater to nitrites and nitrates and to provide nitrified wastewater. In the process, the nitrified wastewater is also passed through the same biologically active material maintained under substantially anoxic conditions to reduce the nitrites and nitrates in the nitrified wastewater to gaseous nitrogen. Advantageously, it has been found that autotrophic and facultative heterotrophic bacteria affixed to a support can both co-exist on the support under alternating anoxic and aerobic conditions.

In accordance with another aspect of this invention, the process for treating wastewater containing nitrogen compounds includes introducing the wastewater into a mixing tank, directing at least a portion of the wastewater from the mixing tank to a filtration tank, contacting the wastewater in the filtration tank with a biologically active material to treat the wastewater, and directing at least a portion of the wastewater from the filtration tank to a clearwell tank. The process further includes recirculating at least a portion of the wastewater in the clearwell tank (e.g., the effluent) back to the filtration tank, contacting the wastewater in the filtration tank with the biologically active material to further treat the wastewater, and directing at least a portion of the wastewater in the filtration tank to the mixing tank for mixing with untreated wastewater. Upon sufficient treatment, the treated wastewater may be recovered. A further feature of the invention is that the wastewater may be passed through the filtration tank containing the biologically active material a sufficient number of times to achieve a treated wastewater that is environmentally safe. As explained previously, a further feature of the invention is that the wastewater to be treated can pass through the biologically active material in the filtration tank under substantially aerobic conditions as well as under substantially anoxic conditions. An oxygen source may be supplied to the filtration tank to provide oxygen to the filtration tank while the wastewater in the filtration tank is passing through the biologically active material under substantially aerobic conditions.

In accordance with another aspect of the invention, a process for treating wastewater containing nitrogen compounds includes introducing wastewater into a mixing tank under anoxic conditions to convert at least a portion of the nitrites and nitrates to gaseous nitrogen and to provide a first treated wastewater; directing at least a portion of the first treated wastewater from the mixing tank into a filtration tank; contacting the first treated wastewater in the filtration tank with a biologically active material under aerobic or anoxic conditions to convert at least a portion of the nitrogen compounds to nitrates and nitrites or to convert at least a portion of the nitrates and nitrites to gaseous nitrogen, and to provide a second treated wastewater; directing at least a portion of the second treated wastewater from the filtration tank to a clearwell tank to provide an effluent comprising the second treated wastewater; recirculating at least a portion of the effluent in the clearwell tank to the filtration tank; contacting the effluent in the filtration tank with the biologically active material under aerobic or anoxic conditions to convert at least a portion of the nitrogen compounds to nitrates and nitrites or to convert at least a portion of the nitrates and nitrites to gaseous nitrogen, and to provide a third treated wastewater; directing at least a portion of the third treated wastewater in the filtration to the mixing tank under aerobic or anoxic conditions to convert at least a portion of the nitrogen compounds to nitrites and nitrates or to convert at least a portion of the nitrates and nitrites to gaseous nitrogen, and to provide a fourth treated wastewater; and recovering at least a portion of the first, second, third, or fourth treated wastewater.

In accordance with another aspect of the invention, an apparatus for treating wastewater containing nitrogen compounds may include a filtration tank containing a biologically active material. In this aspect, the filtration tank will have at least one inlet communicating with the tank, an aerator connected to the filtration tank for introducing air or some other oxygen source into the tank, and means for operating the filtration tank under substantially anoxic conditions. The means for operating the filtration tank under substantially anoxic conditions may comprise a valve or other similar device that limits or eliminates the introduction of air into the filtration tank.

In accordance with another aspect of the invention, an apparatus for treating wastewater containing nitrogen compounds includes a mixing tank including an upper equalization area, a lower sludge settling area, a first inlet for receiving wastewater, and a second inlet for receiving recirculated treated wastewater. The apparatus also includes a filtration tank having a first inlet, a second inlet and a third inlet, the second inlet of the filtration tank communicating with the second inlet of the mixing tank. The filtration tank contains the biologically active material. An adjustable aeration inlet communicates with the filtration tank and supplies air to the filtration tank when the filtration tank is operated under substantially aerobic conditions and eliminates or at least reduces the air supply to the filtration tank when the filtration tank is operated under substantially anoxic conditions. The apparatus also includes a clearwell having a first and second inlet, the first inlet of the clearwell in communication with the third inlet of the filtration tank and the second inlet of the clearwell for discharging the treated wastewater. A further feature of the present invention is that the apparatus may also comprise a conduit for communication between the second inlet of the mixing tank and the first inlet of the filtration tank, and the third inlet of the filtration tank and the first inlet of the clearwell. This conduit may be a pipe or an arrangement of pipes, a weir, a baffle or any similar device capable of transferring the wastewater being treated from one tank to another.

In accordance with another aspect of the invention, the filtration tank containing a biologically active material is configured to pass wastewater to be treated through the biologically active material in a first direction and to also pass wastewater to be treated through the biologically active material in a second direction.

Referring now to FIG. 1, in a specific embodiment, the apparatus includes a mixing tank 10, a filtration tank 20, and a clearwell 30. The mixing tank 10 includes a first inlet 11 for receiving wastewater containing nitrogen compounds, such as ammonia and organic nitrogen compounds, BODs, and suspended solids and a second inlet 15 which may be in communication with the first inlet 21 of the filtration tank 20. The wastewater introduced through the inlet 11 of the mixing tank 10 may come from any number of sources, including sewage, drinking water, irrigation water, and certain industrial waters as discussed above. The wastewater introduced to the mixing tank 10 may already have been partially treated, although prior treatment is not required. For example, screening or grit removal may be included. Filtration tank 20 has a second inlet 29 in communication with the first inlet 31 of the clearwell 30. The clearwell 30 also has a second inlet 39 to discharge the treated wastewater. Inlets 15, 21, 29 and 31 may be connected by conduits such as pipes, weirs, baffles or other similar devices capable of transferring the wastewater being treated from one tank to another. Although the specific embodiment in FIG. 1 shows the wastewater being transferred directly between the different tanks, it is understood that other devices (not shown) such as pumps or filtration devices may be interposed between the tanks in accordance with treatment needs.

Figure 2:
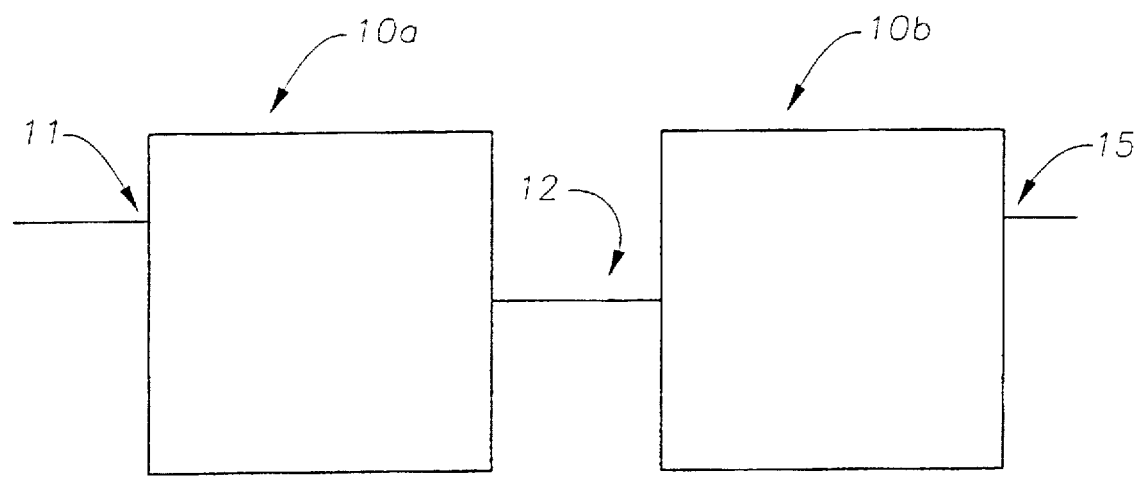
FIG. 2 is a schematic illustration of an embodiment of an apparatus for conducting the process of the invention where the flow equalization/return flow storage area is separate from the anoxic pretreatment/sludge storage area.

The mixing tank 10 functions as an equalization/return flow storage area and an anoxic pretreatment/sludge storage area. As illustrated in FIG.1, the equalization/return flow storage area and the anoxic pretreatment/sludge storage area may be located in one tank. However, in another embodiment shown in FIG. 2, the apparatus has one tank to function as the flow equalization/return flow storage tank 10b and another tank to function as the anoxic pretreatment/sludge storage tank 10a. In a residential system, a conventional septic tank may be used as the anoxic pretreatment/sludge storage tank 10a. The flow equalization/return flow storage tank 10b and the anoxic pretreatment/sludge storage tank 10a may be connected by conduit 12. The flow equalization/return flow storage tank 10b equalizes and stores forward flow prior to treatment in the biological media filter. Referring to FIGS. 1 and 2, the flow equalization/return flow storage area of the mixing tank 10 of the flow equalization storage tank 10b provides operating volume and flow equalization for the reverse mode effluent. The anoxic pretreatment/sludge storage area of the lower portion of the mixing tank 10 and the anoxic pretreatment/sludge storage tank 10a settle inert and biological solids that are included in the wastewater to be treated as well as backwash solids that are included in the reverse flow from the filtration tank 20. The anoxic pretreatment/sludge storage area provides a degree of denitrification for the return flow using the incoming flow as a carbon source, and to store and biologically digest settled sludge. Digestion of biological solids in the lower portion of the mixing tank creates an additional source of soluble BOD which is used for denitrification. In a preferred embodiment, a difference in elevation between the high water level in the mixing tank and the first inlet 31 of the clearwell creates the driving force for gravity flow of the wastewater from the mixing tank 10 through the filtration tank 20 to the clearwell 30.

The filtration tank 20 is multifunctional and comprises a nitrogen treatment zone. The filtration tank 20 acts as a reactor since it contains the biologically active material 23. The filtration tank 20 containing the biologically active material 23 also acts as a filter of suspended solids entering the filtration tank 20 from the mixing tank 10. The biologically active material 23 may comprise a plastic medium or a sheet, but preferably comprises granular media which functions as a support for the microorganisms. More preferably, the biologically active material is a fixed film. Advantageously, the filtration tank 20 is capable of operating in alternating upflow and downflow modes, as well as in alternating aerobic and anoxic modes. Beneficially, the regular alternating of upflow and downflow modes increases the efficiency of the treatment process by redistributing the mixed culture of organisms throughout the media. Preferably, the flow from the mixing tank 10 through the filtration tank 20 to the clearwell 30 flows down through the filtration tank 20 and the biologically active material 23 and up through the filtration tank 20 and the biologically active material 23 when the flow is from the clearwell 30 through the filtration tank 20 to the mixing tank 10.

As explained above, the biologically active material 23 functions as both a filter and a fixed film reactor. The support material, e.g., the solid granules, of the biologically active material is inoculated with nitrifying organisms, such as autotrophs, and denitrifying organisms, such as heterotrophs. These organisms act upon the wastewater to oxidize nitrogen compounds in the wastewater to nitrates and nitrites when the filtration tank is in the aerobic mode and to reduce the nitrates and nitrites to gaseous nitrogen when the filtration tank is operated in the anoxic mode. As a fixed film reactor, carbonaceous BOD and nitrogen compounds are oxidized while the filtration tank 20 is operating in a substantially aerobic mode. When the filtration tank 20 is operated in a substantially aerobic mode, an oxygen source 25 provides oxygen to the filtration tank 10. The oxygen source 25 provides oxygen to oxidize contaminants in the wastewater as described above. The oxygen source 25 may be an aerator, a blower, a tank supplying oxygen, or the like that is capable of providing oxygen to the filtration tank. Another oxygen source could comprise an agitator (not shown) in the filtration tank, or an eductor attached to one of the pumps which is capable of supplying oxygen to the wastewater and to the biological material. Means to control the flow of the oxygen source, such as a valve, may be used to limit or eliminate the flow from the oxygen source 25 to the filtration tank 20. In one preferred embodiment, the oxygen source 25 is in communication with the lower portion of the filtration tank. More preferably, the oxygen source 25 is in communication with the filtration tank 20 below the biologically active material 23.

The filtration tank may also be operated in a substantially anoxic mode by limiting or eliminating the flow of gas from the oxygen source 25. This may be accomplished by various means, but preferably comprises a valve 26. When the filtration tank 20 is operated in a substantially anoxic mode, the biologically active media reduce nitrates and nitrites in the wastewater being treated to form gaseous nitrogen, primarily elemental nitrogen. During denitrification, some portion of the nitrates and nitrites may also be converted to nitrous oxide, also a gas. Gaseous nitrogen and other gases may be discharged from the filtration tank through a vent 27 or the like for release to the atmosphere or for further processing.

Figure 3:
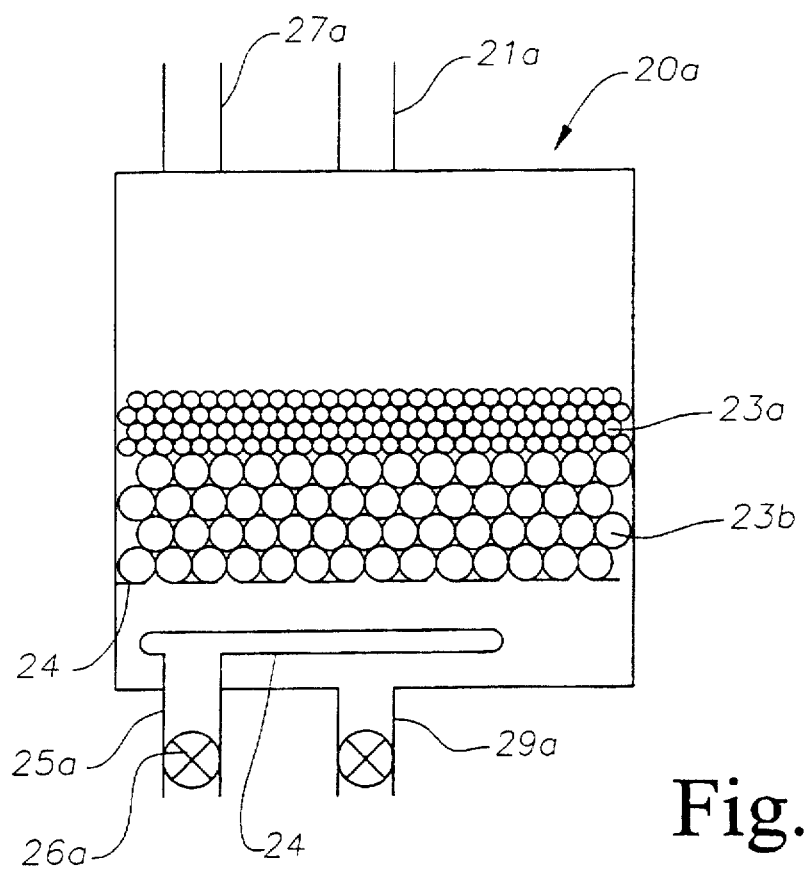
FIG. 3 is a schematic illustration of a preferred embodiment of the filtration tank for conducting the process of the invention.

Referring to FIG. 3, in one particular embodiment of the invention, filtration tank 20a comprises a conduit 21a which is connected to the mixing tank (not shown), a conduit 29a which is connected to the clearwell (not shown), a vent 27a for releasing gaseous nitrogen formed during denitrification, a bed of coarse gravel 23b situated on an air pervious false bottom 24, and a layer of coarse sand 23a situated on the coarse gravel 23b. Below the air pervious false bottom 24 is an air diffuser 28 which is connected to conduit 25a extending through filtration tank 20a. A valve 26a affixed to conduit 25a regulates the flow of oxygen to the diffuser 28.

The clearwell 30 provides holding capacity for treated wastewater. In one preferred embodiment, a pump in communication with the clearwell 30 transfers partially treated wastewater back to the filtration tank 20, through the biologically active medium 23, and into the mixing tank 10. In this embodiment, this pump also provides effective backwashing, which will be described in more detail below. In an additional embodiment, the clearwell communicates with a pump to discharge treated wastewater via inlet 39. Depending on the raw wastewater generation rate, treatment objectives, and regulatory requirements, additional equipment may be required, such as a separate equalization tank and a separate sludge storage tank, a transfer station, and dual-train treatment equipment (not shown).

In one aspect of the invention, a process for treating wastewater containing nitrogen compounds includes the use of a biologically active material to reduce the level of nitrogen compounds, BOD and total suspended solids in the wastewater. As explained above, these reductions may be achieved by oxidizing carbonaceous BOD and nitrogen compounds while operating in a substantially aerobic mode, and reducing nitrites and nitrates to gaseous nitrogen while operating in a substantially anoxic mode.

Again, referring to FIG. 1, in the process a wastewater containing nitrogen compounds is charged to the mixing tank 10 through inlet 11. In the mixing tank 10, inert and biologically active solids settle out of solution in the lower portion of the mixing tank 10. The operating volume of the mixing tank 10 is discharged from the mixing tank 10 through the second inlet 15 of the mixing tank 10 and enters the filtration tank 20 through the first inlet 21 of the filtration tank. As the wastewater enters the filtration tank 20, the wastewater contacts the biologically active material 23. The biologically active material 23 also functions to filter any solids that have entered the filtration tank. The process also includes an oxygen source 25 that supplies oxygen to the filtration tank 20 when the filtration tank 20 is operated in a substantially aerobic mode to oxidize carbonaceous BOD and nitrogen compounds in the wastewater. The wastewater treated under aerobic conditions in the filtration tank 20 then is discharged through the second inlet 29 and enters the clearwell 30 through the first inlet 31 of the clearwell 30. The wastewater in the clearwell 30 is recirculated through inlet 31 of the clearwell 30 to the filtration tank 20 through inlet 29 of the filtration tank 20. The recirculated wastewater flows through the biologically active material 23 and is transferred via inlet 21 of the filtration tank 20 to the mixing tank 10 via inlet 15 of the mixing tank 10. In one preferred embodiment, the filtration tank 20 may have an inlet 22 which communicates with an inlet 16 of the mixing tank 10 (shown by a dotted line) to transfer the recirculated wastewater from the filtration tank 20 to the mixing tank 10. In this embodiment, inlet 16 is above inlet 15. Further, in this particular embodiment, a valve (not shown) communicates with inlet 15 to prevent flow to or from the mixing tank 10 through inlet 15 when recirculated wastewater is transferred from the filtration tank 20 to the mixing tank 10.

In a preferred embodiment, the process of transferring wastewater from the mixing tank 10 through the filtration tank to the clearwell 30, recirculating the wastewater to the clearwell 30 through the filtration tank 20 to the mixing tank 10 is repeated, this time under substantially anoxic conditions. Substantially anoxic conditions can be achieved by limiting or eliminating the oxygen source 25. In one preferred embodiment the oxygen from the oxygen source 25 can be limited or eliminated by closing valve 26. By limiting or eliminating the oxygen from the oxygen source 25, the biologically active material 23 reduces at least a portion of the nitrates and nitrites formed in the wastewater to gaseous nitrogen.

In another embodiment of the invention, the wastewater to be treated may be transferred from the mixing tank 10 through the filtration tank 20 to the clearwell 30 under substantially aerobic conditions, and recirculated from the clearwell 30 through the filtration tank 20 to the mixing tank 10 under substantially anoxic conditions.

The concentration of nitrogen compounds in the wastewater can be reduced through the cyclical action of the process described, including alternating the supply and denial of oxygen to the filtration tank during aerobic and anoxic conditions as described above. The cycles described above may be repeated multiple times to achieve a treated wastewater that is environmentally safe. For instance, in one preferred embodiment, the first cycle is operated under aerobic conditions. The second cycle is operated under anoxic conditions. The third cycle is a repeat of the first cycle and the fourth cycle is a repeat of the second cycle. A preferred cycling procedure is to cycle the wastewater back and forth through the filter media under aerobic conditions to convert the nitrogen compounds to nitrates and nitrites and after a desired level of nitrification, to eliminate the flow of oxygen to the filter media and to cycle the nitrified wastewater back and forth through the filter media under substantially anoxic conditions to convert the nitrates and nitrites to gaseous nitrogen. Preferably, the treated wastewater has a level of nitrogen contaminants no greater than about 10 mg/L without supplemental carbon feed (e.g., methanol) and about 3 mg/L with supplemental carbon feed. The wastewater has a BOD level no greater than about 30 mg/L, and a total suspended solids level no greater than about 30 mg/L.

In another preferred embodiment, the wastewater being treated is transferred from the mixing tank 10 through the filtration tank 20 to the clearwell tank 30 taking advantage of the difference in elevation of inlet 15 of the mixing tank 10 and inlet 31 of the clearwell 30 using the driving force of gravity. In this embodiment, wastewater in the clearwell 30 is recycled through the filtration tank 20 to the mixing tank 10 by a pump in communication with the clearwell 30.

In still another preferred embodiment, the recycling of wastewater from the clearwell 30 through the filtration tank 20 containing the biologically active material 23 and to the mixing tank 10 backwashes the biologically active material 23 and dislodges particulates previously filtered by the biologically active material 23. Beneficially, the backwashing also redistributes the biologically active material 23.

As an additional embodiment, the clearwell 30 may be equipped with two discharge pumps. These pumps may be controlled by a conventional timer and open float switches (not shown). When the timer has timed out (ensuring completion of a batch), one of the discharge pumps transfers treated effluent to a leaching field or other surface water discharge location (not shown). The second pump recirculates wastewater from the clearwell through the filtration tank, to the mixing tank.

It is to be understood that the invention is not to be limited or restricted to the specific examples or embodiments described herein, which are intended to assist a person skilled in the art in practicing the invention. Although the invention is preferably directed to the removal of nitrogen compounds from wastewater, it is not necessarily limited to such applications. For example, the invention may also be used to reduce phosphorus contaminants or BOD pollutants in wastewater. Additionally, although the processes and apparatus of the invention are preferably operated in a batch mode, they may also be operated in a continuous mode. Furthermore, instead of having a separate clearwell tank, the filtration tank may also include a lower storage area, located below the biologically active material, to act as the clearwell. Still further, the various components may be configured or connected in a variety of ways, for example, by placing a mixing tank within an annular filtration tank. In addition, the invention may also be applied to large scale treatment facilities or industrial applications. Accordingly, the scope of the invention should be determined based on the claims below, including any equivalents thereof.

What is claimed is:

1. A process for treating wastewater containing nitrogen compounds, comprising the steps of:

passing the wastewater through a biologically active material maintained under substantially aerobic conditions to oxidize at least a portion of the nitrogen compounds in the wastewater to nitrites and nitrates to provide nitrified wastewater; and passing the nitrified wastewater through the same biologically active material maintained under substantially anoxic conditions to reduce at least a portion of the nitrites and nitrates in the nitrified wastewater to gaseous nitrogen.

2. The process according to claim 1 further comprising the step of removing at least a portion of the treated wastewater that has contacted the biologically active material.

3. The process according to claim 1 wherein the biologically active material comprises granular media.

4. The process according to claim 1 wherein the wastewater passes through the biologically active material at least two times, in a first direction and in a second direction.

5. The process according to claim 1 wherein the wastewater passes through the biologically active material at least two times, in a first direction and in a second direction; wherein the biologically active material comprises granular media to provide filtration sufficient to remove solid particulates from the wastewater flowing in the first direction; and wherein the wastewater flowing in the second direction provides backwashing to dislodge at least a portion of the particulates from the media, said particulates lodging in the media during filtration.

6. The process according to claim 4 wherein the wastewater passing through the biologically active material in the first direction is in a downflow direction and the wastewater passing through the biologically active material in the second direction is in an upflow direction.

7. The process according to claim 4 wherein the treated wastewater passing through the biologically active material in the second direction passes through the biologically active material in a direction substantially opposite to the wastewater passing through the biologically active material in the first direction.

8. The process according to claim 1 wherein the biologically active material comprises a granular media with a density of about 160 to 170 lbs/ft$^3$.

9. The process according to claim 1 wherein the biologically active material comprises a granular media having an effective size range of about 2 to 3 mm, a maximum uniformity coefficient of about 1.35, a minimum sphericity of 0.85, about a 6 to 7 on the Moh hardness scale, a minimum specific gravity of about 2.6, and a maximum hydrochloric acid solubility of 5%.

10. The process according to claim 1 wherein the biologically active material comprises a fixed film.

11. The process according to claim 1 wherein the biologically active material comprises a granular media with a porosity of less than about 80%.

12. The process according to claim 1 wherein the biologically active material comprises a plastic medium.

13. The process according to claim 1 wherein the biologically active material comprises at least one sheet with biologically active organisms on the surface of the sheet.

14. The process according to claim 1 wherein the biologically active medium comprises autotrophic and facultative heterotrophic bacteria.

15. The process according to claim 1 further comprising the step of removing at least a portion of the wastewater that has passed through the biologically active material.

16. The process according to claim 1 further comprising the step of removing at least a portion of the wastewater that has passed through the biologically active material, wherein the treated wastewater removed has a level of nitrogen compounds no greater than about 10 mg/L if supplemental carbon is not supplied to the wastewater and about 3 mg/L if supplemental carbon is supplied to the wastewater.

17. The process according to claim 1 further comprising the step of removing at least a portion of the treated wastewater that has contacted the biologically active material, wherein the treated wastewater removed has a BOD level no greater than about 30 mg/L.

18. The process according to claim 1 further comprising the step of removing at least a portion of the wastewater that has passed through the biologically active material, wherein the wastewater removed has a total suspended solids level no greater than about 30 mg/L.

19. The process according to claim 1 further comprising the step of contacting the wastewater in a filtration tank with the biologically active material under substantially aerobic conditions followed by the step of contacting the wastewater in the filtration tank with the biologically active material under substantially anoxic conditions.

20. The process of claim 19 further comprising supplying an oxygen source to the filtration tank while contacting the wastewater in the filtration tank with the biologically active material under substantially aerobic conditions.

* * * * *